US008644894B2

(12) United States Patent
Qiu

(10) Patent No.: US 8,644,894 B2
(45) Date of Patent: Feb. 4, 2014

(54) MOBILE WIRELESS DEVICE WITH MULTI-BAND ANTENNA AND RELATED METHODS

(75) Inventor: Meide Qiu, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 531 days.

(21) Appl. No.: 12/945,200

(22) Filed: Nov. 12, 2010

(65) Prior Publication Data

US 2011/0223873 A1 Sep. 15, 2011

Related U.S. Application Data

(60) Provisional application No. 61/313,337, filed on Mar. 12, 2010.

(51) Int. Cl.
*H04M 1/00* (2006.01)

(52) U.S. Cl.
USPC ........ 455/575.7; 455/90.3; 343/726; 343/702

(58) Field of Classification Search
USPC ....................... 455/90.2, 575.7, 575.1, 550.1; 29/600–601; 343/702, 726, 728
See application file for complete search history.

(56) References Cited

U.S. PATENT DOCUMENTS 5,083,136 A * 1/1992 Wells ............................ 343/822
5,198,826 A * 3/1993 Ito ................................. 343/726
5,748,512 A 5/1998 Vargas ..................... 364/709.12
6,160,354 A 12/2000 Ruvinskiy et al. .......... 315/169.3
6,980,173 B2 * 12/2005 Man et al. ...................... 343/841
7,068,230 B2 * 6/2006 Qi et al. ......................... 343/702
7,113,135 B2 9/2006 Jo et al. .......................... 343/702
7,205,942 B2 4/2007 Wang et al. ................... 343/700
7,310,344 B1 12/2007 Sue ............................... 370/410
7,679,569 B2 * 3/2010 Takaki et al. ................. 343/702
2006/0186986 A1 8/2006 Ma et al. ......................... 340/3.9
2007/0171158 A1 7/2007 Kumar ............................ 345/82
2007/0247429 A1 10/2007 Westerman ................... 345/168

FOREIGN PATENT DOCUMENTS

WO WO 03/107168 12/2003

OTHER PUBLICATIONS

Jung et al., Internal Folded Loop Antenna with Tuning Notches for GSM/GPS/DCS/PCS Mobile Handset Applications, Aug. 2006, pp. 1501-1504.
Himberg et al., On-Line Personalization of a Touch Screen Based Keyboard, Jan. 2003, pp. 1-8.
Cheng et al., Temporal Vision-Guided Energy Minimization for Portable Displays, Oct. 2006, pp. 1-6.

* cited by examiner

*Primary Examiner* — Nay A Maung
*Assistant Examiner* — Angelica M Perez
(74) *Attorney, Agent, or Firm* — Allen, Dyers, Doppelt, Milbrath & Gilchrist, P.A. Attorneys at Law

(57) ABSTRACT

A mobile wireless communications device may include a portable housing, and a printed circuit board (PCB) carried by the housing and having opposing upper and lower portions. The device may also include at least one wireless transceiver carried by the portable housing, and a satellite positioning signal receiver carried by the portable housing. An antenna assembly may be carried adjacent the upper portion of the PCB. The antenna assembly may include a horizontal conductor extending along the upper portion of the PCB in spaced relation therefrom. The horizontal conductor may be coupled to the satellite positioning receiver. The antenna assembly may also include a loop conductor extending from the horizontal conductor toward the lower portion of the PCB and in spaced relation from the PCB. The loop conductor may be coupled to the wireless transceiver.

21 Claims, 6 Drawing Sheets

MOBILE WIRELESS DEVICE WITH MULTI-BAND ANTENNA AND RELATED METHODS

RELATED APPLICATION

The present application is based upon previously filed provisional application Ser. No. 61/313,337, filed Mar. 12, 2010, the entire subject matter of which is incorporated by reference in its entirety.

TECHNICAL FIELD

The present disclosure generally relates to the field of wireless communications systems, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing antennas that provide desired operating characteristics within the relatively limited amount of space available for antennas.

DETAILED DESCRIPTION

Figure 1:
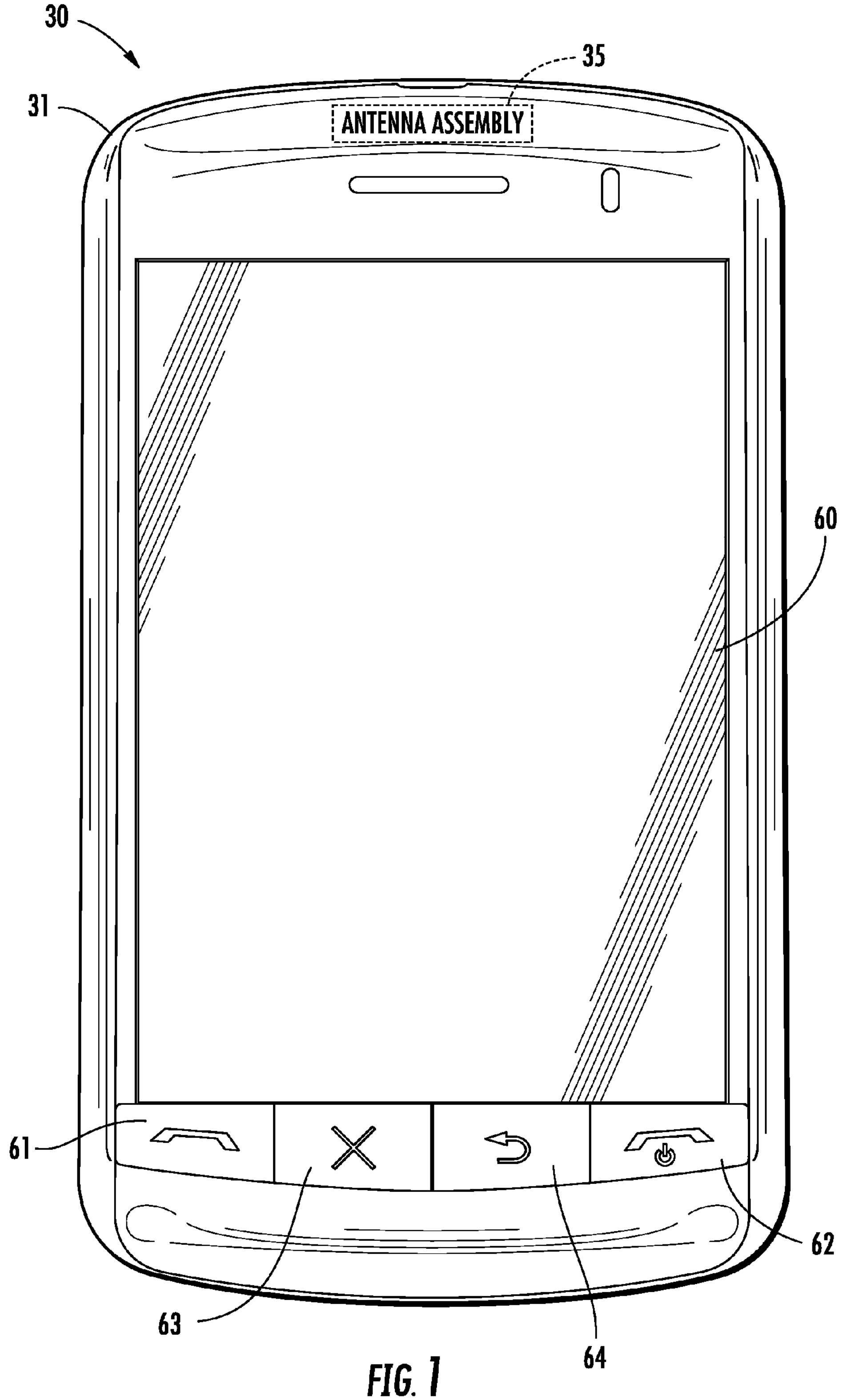
FIG. 1 is a front view of a mobile wireless communications device including an antenna assembly in accordance with one exemplary aspect.
Figure 2:
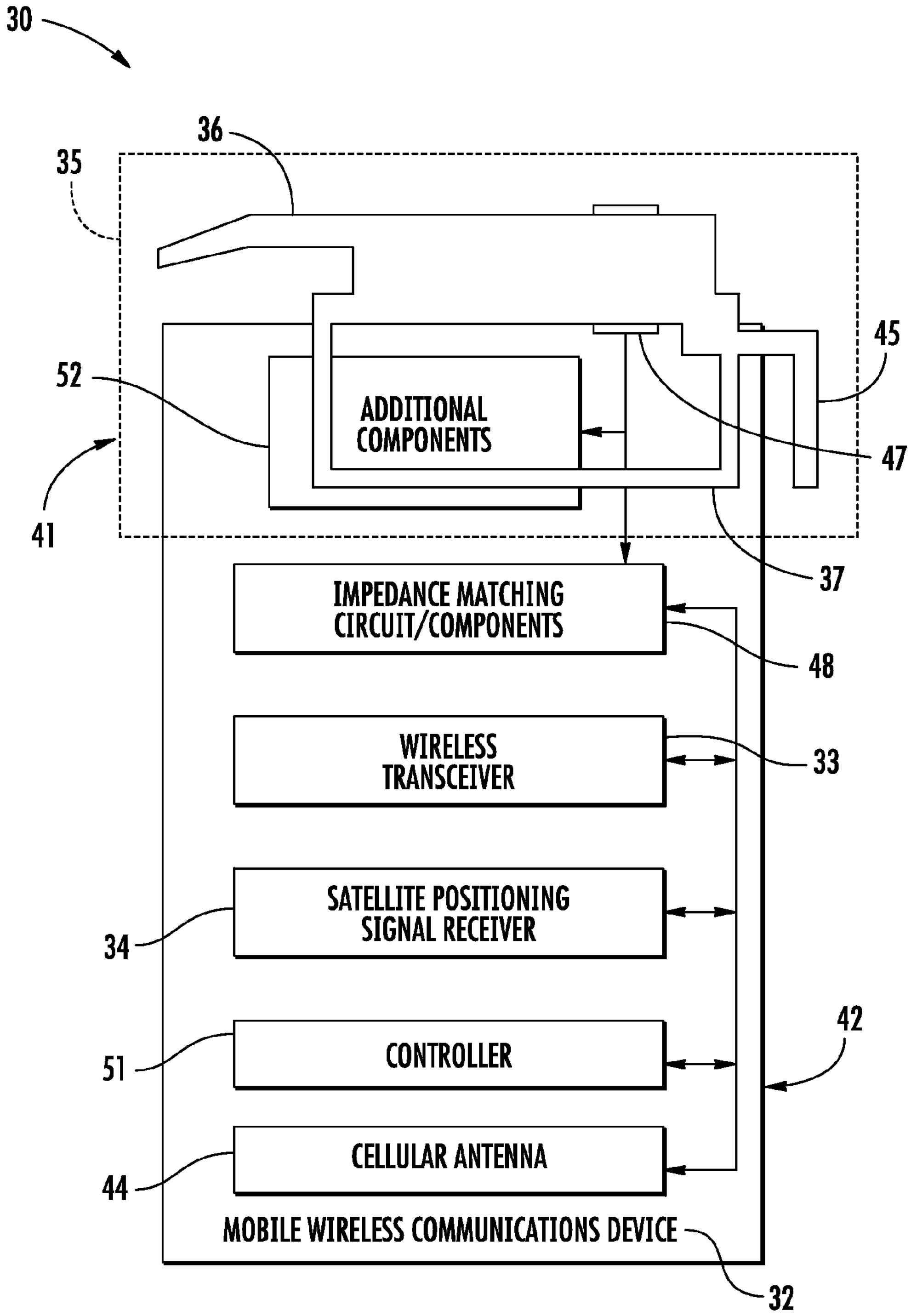
FIG. 2 is a schematic diagram of the printed circuit board (PCB) of the device of FIG. 1.
Figure 3:
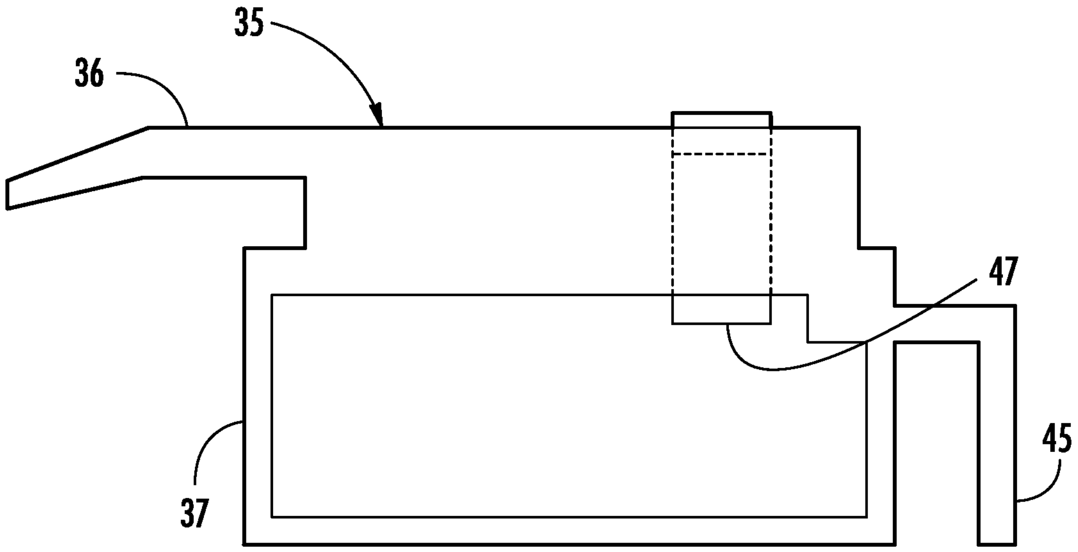
FIG. 3 is an enlarged view of the antenna assembly of FIG. 2.
Figure 4:
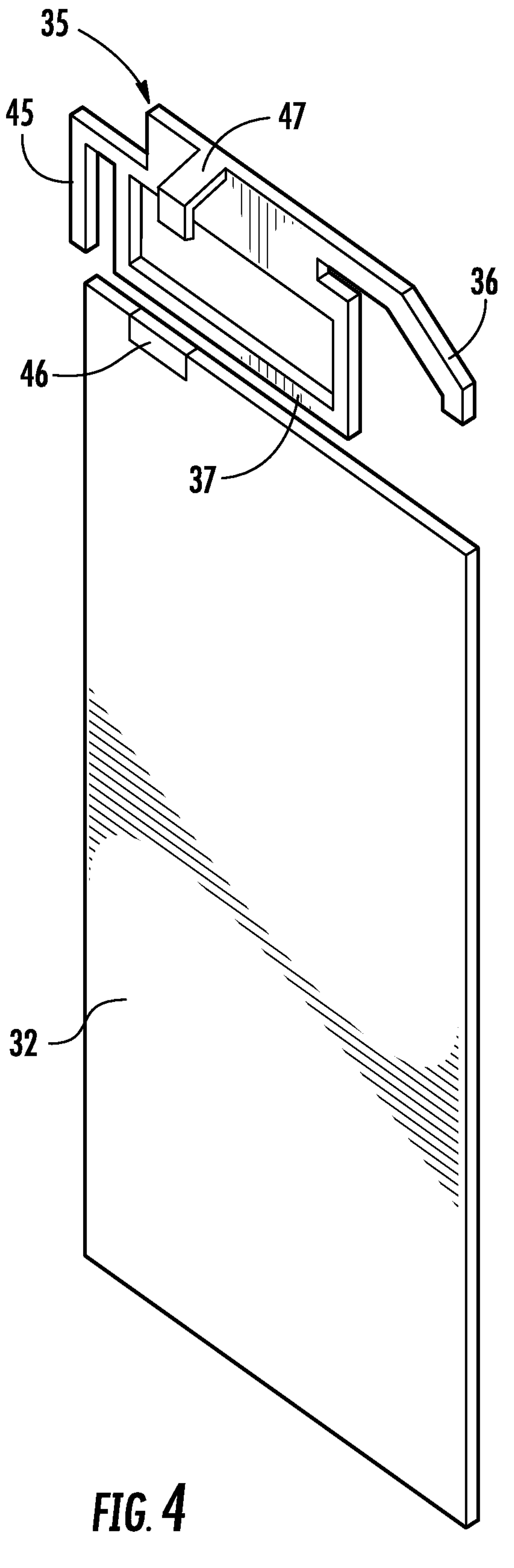
FIG. 4 is perspective view of the antenna assembly of FIG. 2 separated from the PCB.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

In accordance with one exemplary aspect, a mobile wireless communications device may include a portable housing and a printed circuit board (PCB) carried by the housing and having upper and lower portions. The mobile wireless communications device may also include at least one wireless transceiver carried by the portable housing, and a satellite positioning signal receiver carried by the portable housing.

An antenna assembly may be carried adjacent the upper portion of the PCB. The antenna assembly may include a horizontal conductor extending along the upper portion of the PCB in spaced relation therefrom. The horizontal conductor may be coupled to the satellite positioning receiver. The antenna assembly may further include a loop conductor extending from the horizontal conductor toward the lower portion of the PCB and in spaced relation from the PCB. The loop conductor may be coupled to the at least one wireless transceiver.

The mobile wireless communications device may further include a cellular antenna carried adjacent the lower portion of the PCB and coupled to the at least one wireless transceiver. The loop conductor may be configured to provide a diversity antenna for the cellular antenna, and configured to provide a Personal Communications Service (PCS) antenna, for example, and the horizontal conductor may be configured to provide a Global Positioning System (GPS) antenna, for example.

The antenna assembly may further include an additional conductor extending from the horizontal conductor toward the lower portion of the PCB and in spaced relation from the PCB and adjacent portions of the loop conductor. The antenna assembly may be a tri-band antenna assembly, for example.

The PCB may include an antenna coupling area, and the mobile wireless communications device may further include a coupling member configured to couple the antenna assembly to the PCB at the antenna coupling area. The mobile wireless communications device may further include at least one additional component carried by the PCB beneath the antenna assembly.

A method aspect is directed to a method for making an antenna assembly for a mobile wireless communications device including a portable housing, a printed circuit board (PCB) carried by the housing and having opposing upper and lower portions, at least one wireless transceiver carried by the portable housing, and a satellite positioning signal receiver carried by the portable housing. The method may include forming a horizontal conductor to extend along the upper portion of the PCB in spaced relation therefrom, the horizontal conductor to be coupled to the satellite positioning receiver, for example. The method may further include forming a loop conductor extending from the horizontal conductor toward the lower portion of the PCB and in spaced relation from the PCB, the loop conductor to be coupled to the at least one wireless transceiver, for example.

Referring initially to FIGS. 1 through 4, a mobile wireless communications device 30 illustratively includes a portable housing 31, a printed circuit board (PCB) 32 carried by the portable housing and having an upper portion 41 and a lower portion 42, and a wireless transceiver 33 carried by the portable housing. In some embodiments, not shown, the PCB 32 may be replaced by or used in conjunction with a metal chassis or other substrate. The PCB 32 may also include a conductive layer (not shown) defining a ground plane.

A satellite positioning signal receiver 34 is also carried by the portable housing 31. The satellite positioning signal receiver 34 may be a Global Positioning System (GPS) satellite receiver, for example.

A cellular antenna 44 is illustratively carried adjacent the lower portion 42 of the PCB 32 and coupled to the wireless transceiver 33. Alternatively, the cellular antenna 44 may be carried by another portion of the PCB 32 in other embodiments. The cellular antenna 44 may be configured to provide a Global System for Mobile Communications (GSM) antenna and a code division multiple access (CDMA) antenna, for example. The cellular antenna 44 may be configured to operate at other frequencies. As will be appreciated by those skilled in the art, the cellular antenna 44 typically occupies a relatively large amount of space within the portable housing 31.

The exemplary device 30 further illustratively includes a display 60 and a plurality of control keys including an "off hook" (i.e., initiate phone call) key 61, an "on hook" (i.e., discontinue phone call) key 62, a menu key 63, and a return or escape key 64. Operation of the various device components and input keys, etc., will be described further below with reference to FIG. 7.

The device 30 further illustratively includes a tri-band antenna assembly 35 carried adjacent the upper portion 41 of the PCB 32. The antenna assembly 35 is carried adjacent the upper portion 41 because the cellular antenna 44 occupies the lower portion 42 of the PCB 32 and/or housing 31. The antenna assembly 35 includes a horizontal conductor 36 extending along the upper portion 41 of the PCB 32 in spaced relation from the upper portion of the PCB. The horizontal conductor 36 is coupled to the satellite positioning receiver 34. The horizontal conductor 36 may be configured to provide a GPS antenna and may operate from 1565 MHz to 1585 MHz, for example. The horizontal conductor 36 may be configured to operate at other frequencies in other embodiments.

Figure 5:
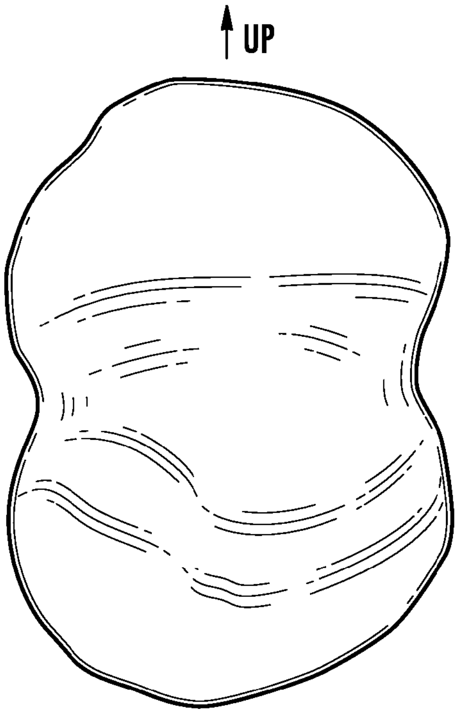
FIG. 5 is a radiation pattern of the antenna assembly of FIG. 2.

Current flows on the horizontal conductor 36 and on the top edge of the PCB 32 or ground plane. This current flow reduces the hand effect, or in other words, the effects of a user's hand on the radiation pattern. The current flow through the horizontal conductor 36 and the PCB 32 also creates a "potato-shaped" free space radiation pattern (FIG. 5). As will be appreciated by those skilled in the art, when the mobile wireless communications device 30 is held in a talking or dialing position (i.e., the upper portion 41 of the PCB 32 is skyward facing), radiation toward the lower portion 42 could be blocked by the user's hand. In other words, the GPS radiation pattern is directed toward the upper and lower portions 41, 42 of the PCB 32 or the top and bottom of the housing 31, respectively, instead of broadside.

A loop conductor 37 extends from the horizontal conductor 36 toward the lower portion of the PCB 32. The loop conductor 37 illustratively extends along a backside of the PCB 32 and is in spaced relation from the PCB. The loop conductor 37 may be coupled to the wireless transceiver 33. The loop conductor 37 may be configured to provide one or both of a diversity antenna for the cellular antenna 44 that may operate between 869 MHz and 894 MHz and a Personal Communications Service (PCS) antenna that may operate between 1930 MHz and 1990 MHz, for example. The loop conductor 37 may be configured to provide another antenna operating at other frequencies in other embodiments. As will be appreciated by those skilled in the art, the length of the horizontal conductor 36 may affect the resonant frequencies of the loop conductor 37, for example, PCS resonance.

Figure 6:
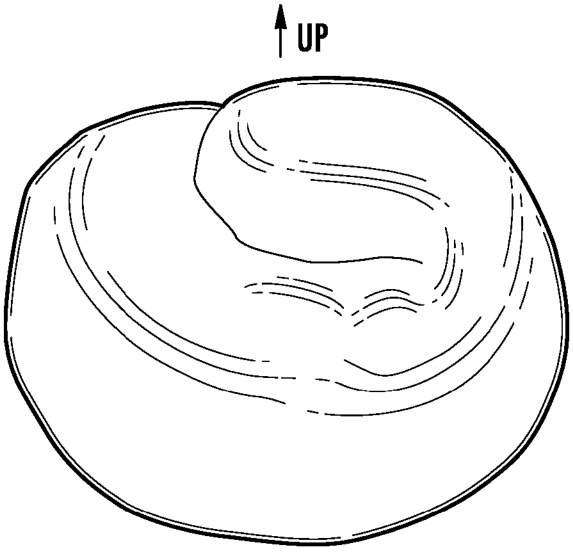
FIG. 6 is a radiation pattern of a three-branch antenna assembly.

The antenna assembly 35 advantageously cooperates with the PCB 32 to provide an improved GPS radiation pattern (FIG. 5). For example, if the loop conductor 37 were to be cut to form a three-branch antenna, the GPS radiation pattern would have a maximum radiation pointing downward or toward the ground (i.e., toward the lower portion 42 of the PCB 32), as illustrated in FIG. 6. A substantially reduced amount, or a small amount of radiation would be directed skyward (i.e. toward the upper portion 41 of the PCB 32) in contrast to the energy directed toward the lower portion 42 or ground (FIG. 6).

The antenna assembly 35 is in spaced relation from the backside of the PCB 32 such that additional components 52 may be carried by the PCB beneath the antenna assembly. More particularly, the loop conductor 37 is in spaced relation from the PCB 32 such that a camera flash, a speaker, an audio jack, and other components, for example, may be between the loop conductor and the PCB or chassis. The spaced relation of the antenna assembly 35 and more particularly the loop conductor 37 advantageously allows for improved utilization of the limited space on the PCB 32 and within the housing 31.

The antenna assembly 35 further illustratively includes an additional conductor 45 extending from the horizontal conductor 36 toward the lower portion. The additional conductor 45 is in spaced relation from the PCB 32 and is adjacent portions of the loop conductor 37. In other words, the additional conductor 45 extends along a side of the PCB 32. The additional conductor 45 advantageously enhances the performance of the loop antenna 37, and more particularly, the additional conductor may be configured to enhance a PCS antenna configured loop conductor.

As will be appreciated by those skilled in the art, the antenna assembly 35 including the horizontal conductor 36, the loop conductor 37, and additional conductor 45, may be a flexible antenna assembly. In other words, the conductors may be printed on a flexible film or substrate. The flexible antenna assembly including the flexible film, may be adhered to the inside back portion of the housing 31, for example. The inside back portion of the housing may include a stanchion (not shown) for supporting the flexible antenna assembly.

The PCB 32 further includes an antenna coupling area 46. The antenna assembly further includes a coupling member 47 configured to couple the antenna assembly 35 to the PCB 32 at the antenna coupling area 46. The coupling member 47 is illustratively L-shaped, and may be, for example, a clip.

The mobile wireless communications device 30 may further include an impedance matching 48 circuit configured to match the impedance of the antenna assembly to a desired impedance. The impedance matching 48 circuit may include lumped components in three different frequency bands, for example. The impedance matching circuit 48 matches the antenna assembly impedance to 50 ohms, for example.

A controller 51 or processor may also be carried by the PCB 32. The controller 51 may cooperate with the other components, for example, the antenna assembly 35, the satellite positioning signal receiver 34, the cellular antenna 44, and the wireless transceiver 33 to coordinate and control operations of the mobile wireless communications device 30. Operations may include mobile voice and data operations, including email and Internet data.

A method aspect is directed to a method of making an antenna assembly 35 for a mobile wireless communications device 30. The mobile wireless communications device 30 includes a portable housing 31, and a PCB 32 carried by portable housing and having opposing upper and lower portions 41, 42. The mobile wireless communications device 30 also includes a wireless transceiver 33 carried by the portable housing 31, and a satellite positioning signal receiver 34 also carried by the portable housing. The method includes forming a horizontal conductor 36 to extend along the upper portion 41 of the PCB 32 in spaced relation therefrom. The horizontal conductor 36 is to be coupled to the satellite positioning receiver 34. The method also includes forming a loop conductor 37 extending from the horizontal conductor 36 toward the lower portion 42 of the PCB 32 and in spaced relation from the PCB. The loop conductor 37 is to be coupled to the wireless transceiver 33.

Exemplary components that may be used in various embodiments of the above-described mobile wireless communications device are now described with reference to an exemplary mobile wireless communications device 1000 shown in FIG. 7. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 7:
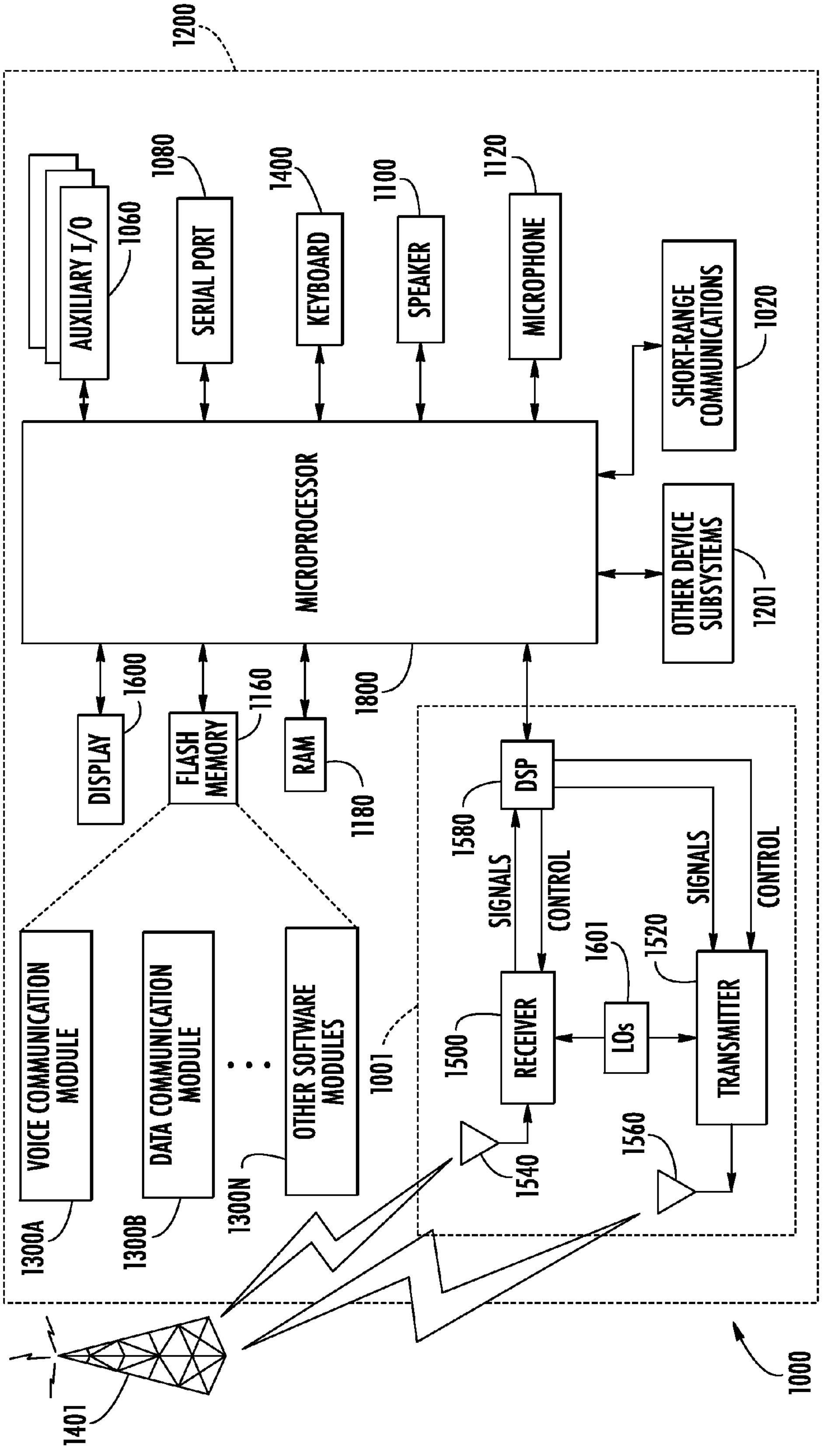
FIG. 7 is a schematic block diagram illustrating additional components that may be included in the mobile wireless communications device of FIG. 1.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (Las) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device.

The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A mobile wireless communications device comprising:
- a portable housing;
- a printed circuit board (PCB) carried by said housing and having opposing upper and lower portions;
- at least one wireless transceiver carried by said portable housing;
- a satellite positioning signal receiver carried by said portable housing; and
- an antenna assembly carried adjacent the upper portion of said PCB and comprising
  - a horizontal conductor extending along the upper portion of said PCB in spaced relation therefrom, said horizontal conductor being coupled to said satellite positioning receiver, and
  - a closed loop conductor extending from said horizontal conductor toward the lower portion of said PCB and in spaced relation from said PCB, said loop conductor being coupled to said at least one wireless transceiver.

2. The mobile wireless communications device according to claim 1, further comprising a cellular antenna carried adjacent the lower portion of said PCB and coupled to said at least one wireless transceiver.

3. The mobile wireless communications device according to claim 2, wherein said closed loop conductor is configured to provide a diversity antenna for said cellular antenna, and configured to provide a Personal Communications Service (PCS) antenna.

4. The mobile wireless communications device according to claim 1, wherein said horizontal conductor is configured to provide a Global Positioning System (GPS) antenna.

5. The mobile wireless communications device according to claim 1, wherein said antenna assembly further comprises an additional conductor extending from said horizontal conductor toward the lower portion of said PCB and in spaced relation from said PCB and adjacent portions of said closed loop conductor.

6. The mobile wireless communications device according to claim 1, wherein said antenna assembly comprises a tri-band antenna assembly.

7. The mobile wireless communications device according to claim 1, wherein said PCB comprises an antenna coupling area; and further comprising a coupling member configured to couple said antenna assembly to said PCB at said antenna coupling area.

8. The mobile wireless communications device according to claim 1, further comprising at least one additional component carried by said PCB beneath said antenna assembly.

9. A mobile wireless communications device comprising:
- a portable housing;
- a printed circuit board (PCB) carried by said housing and having opposing upper and lower portions;
- at least one wireless transceiver carried by said portable housing;
- a satellite positioning signal receiver carried by said portable housing;
- a cellular antenna carried adjacent the lower portion of said PCB and coupled to said at least one wireless transceiver; and
- an antenna assembly carried adjacent the upper portion of said PCB and comprising
  - a horizontal conductor extending along the upper portion of said PCB in spaced relation therefrom, said horizontal conductor being coupled to said satellite positioning receiver,
  - a closed loop conductor extending from said horizontal conductor toward the lower portion of said PCB and in spaced relation from said PCB, said closed loop conductor being coupled to said at least one wireless transceiver, and
  - an additional conductor extending from said horizontal conductor toward the lower portion of said PCB and in spaced relation from said PCB and adjacent portions of said closed loop conductor.

10. The mobile wireless communications device according to claim 9, wherein said closed loop conductor is configured to provide a diversity antenna for said cellular antenna, and configured to provide a Personal Communications Service (PCS) antenna.

11. The mobile wireless communications device according to claim 9, wherein said horizontal conductor is configured to provide a Global Positioning System (GPS) antenna.

12. The mobile wireless communications device according to claim 9, wherein said antenna assembly comprises a tri-band antenna assembly.

13. The mobile wireless communications device according to claim 9, wherein said PCB comprises an antenna coupling area; and further comprising a coupling member configured to couple said antenna assembly to said PCB at said antenna coupling area.

14. The mobile wireless communications device according to claim 9, further comprising at least one additional component carried by said PCB beneath said antenna assembly.

15. A method for making an antenna assembly for a mobile wireless communications device comprising a portable housing, a printed circuit board (PCB) carried by the housing and having opposing upper and lower portions, at least one wireless transceiver carried by the portable housing, and a satellite positioning signal receiver carried by the portable housing, the method comprising:
- forming a horizontal conductor to extend along the upper portion of the PCB in spaced relation therefrom, the horizontal conductor to be coupled to the satellite positioning receiver; and forming a closed loop conductor extending from the horizontal conductor toward the lower portion of the PCB and in spaced relation from the PCB, the closed loop conductor to be coupled to the at least one wireless transceiver.

16. The method according to claim 15, wherein the mobile wireless communications device further comprises a cellular antenna carried adjacent the lower portion of the PCB and coupled to the at least one wireless transceiver, and wherein the closed loop conductor is configured to provide a diversity antenna for said cellular antenna and a Personal Communications Service (PCS) antenna.

17. The method according to claim 15, further comprising forming an additional conductor extending from the horizontal conductor toward the lower portion of the PCB and in spaced relation from the PCB and adjacent portions of the closed loop conductor.

18. The method according to claim 15, wherein the horizontal conductor is configured to provide a Global Positioning System (GPS) antenna.

19. The method according to claim 15, wherein the antenna assembly comprises a tri-band antenna assembly.

20. The method according to claim 15, wherein the PCB comprises an antenna coupling area; and wherein the mobile wireless communications device further comprises a coupling member to couple the antenna assembly to the PCB at the antenna coupling area.

21. The method according to claim 15, wherein the mobile wireless communications device further comprises at least one additional component carried by the PCB beneath the antenna assembly.

* * * * *